Jan. 2, 1951  L. S. TREESE  2,536,828
AUTOMOBILE HEADLIGHT SWITCH MECHANISM
Filed April 11, 1947  2 Sheets-Sheet 1
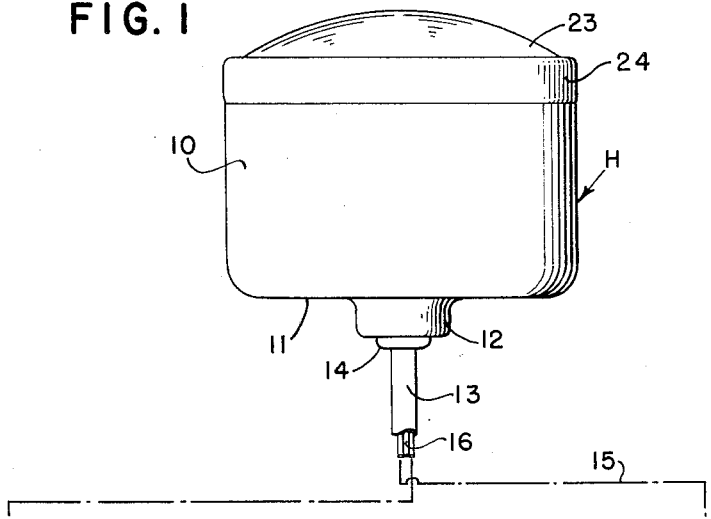
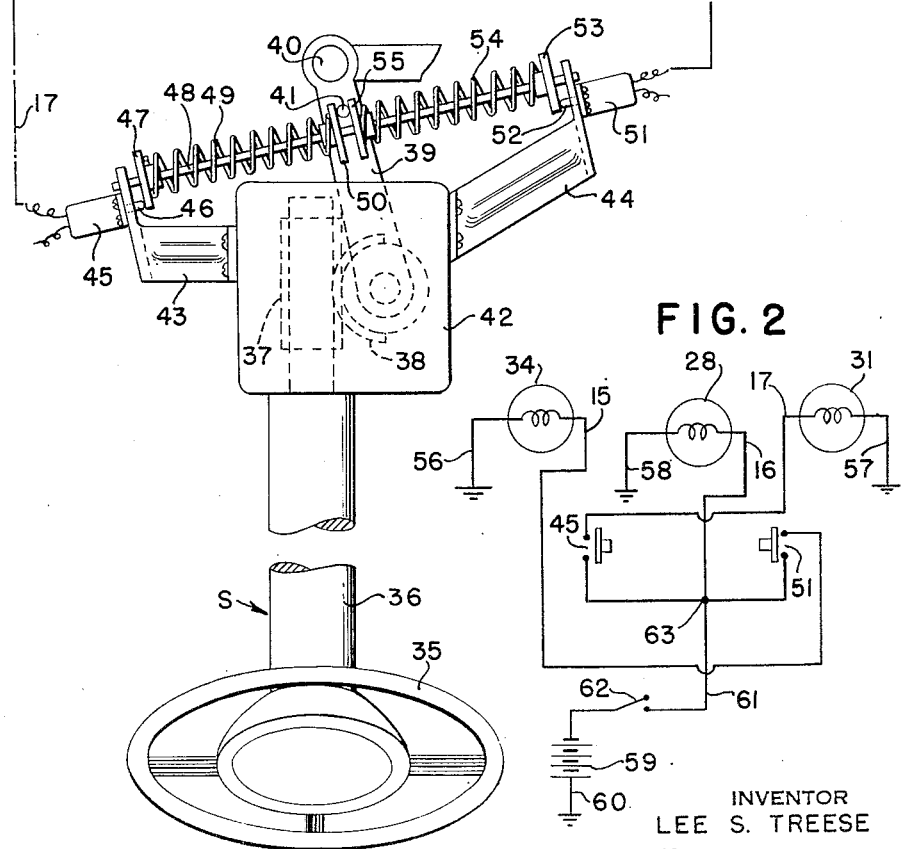
INVENTOR
LEE S. TREESE
BY
Toulmin & Toulmin
ATTORNEYS

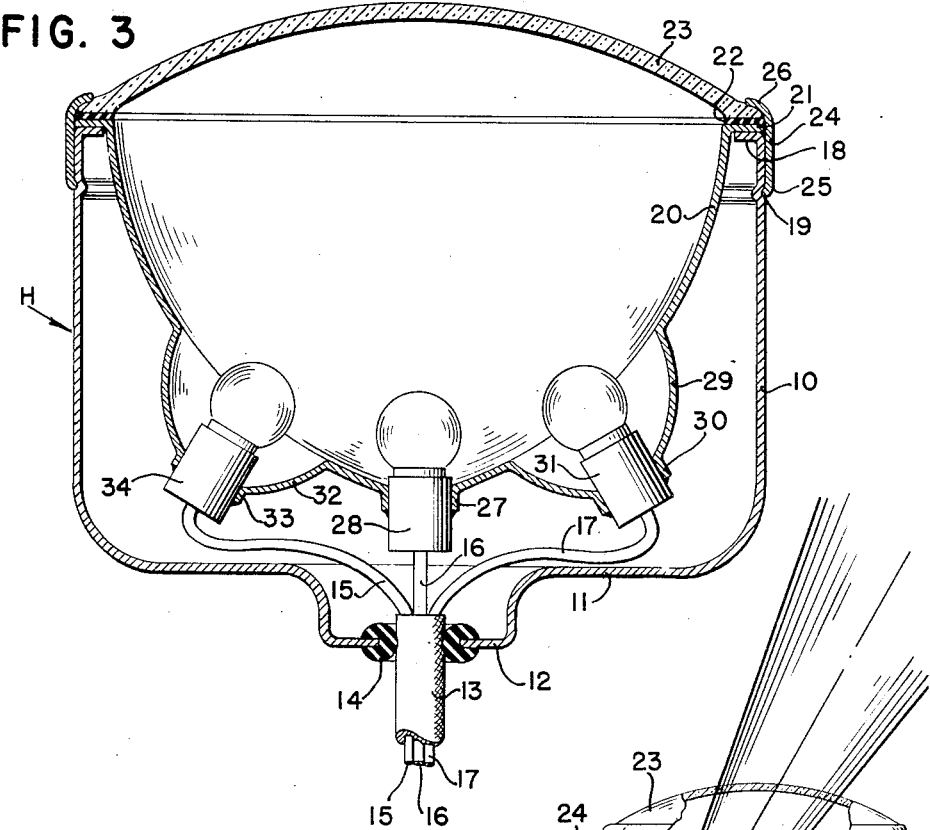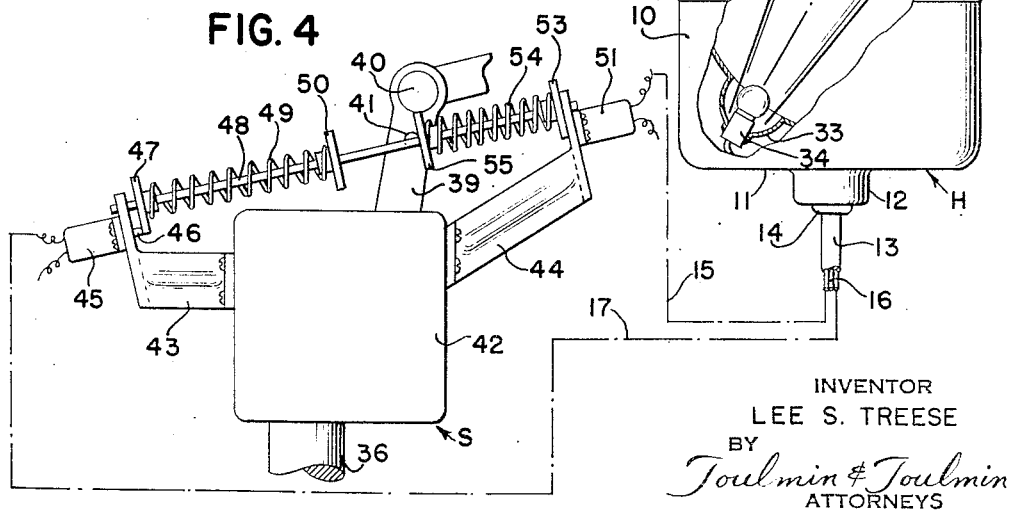

Patented Jan. 2, 1951

2,536,828

UNITED STATES PATENT OFFICE 2,536,828

AUTOMOBILE HEADLIGHT SWITCH MECHANISM

Lee S. Treese, Dearborn, Mich., assignor to Tucker Corporation, Chicago, Ill., a corporation of Delaware Application April 11, 1947, Serial No. 740,796

3 Claims. (Cl. 200—59)

1

The present invention deals with automobile headlights and is concerned primarily with a headlight capable of casting a beam of light in various directions.

At the present time it is standard practice in the automotive industry to provide an automobile with a pair of headlights, each of which casts a beam of light forwardly of the car so as to illuminate the road surface immediately in front of the car. Such illumination is adequate for ordinary straight driving, but occasions will arise when the driver must make a turn, and on such occasions he is often handicapped by insufficient illumination in the direction in which the turn is being made.

With the foregoing conditions in mind, this invention has in view as its foremost objective, the provision of a headlight which is capable of overcoming the above-noted difficulties.

More in detail, the invention has as an object the provision of a headlight designed for use in an automobile which includes a main lamp which consistently casts a beam of light forwardly and a pair of auxiliary lamps which are included in an electrical circuit which is operatively associated with the steering mechanism of the car, so that as the steering mechanism is operated to make the turn, the proper auxiliary light is turned on to cast a beam in the direction in which the turn is being made.

Another object of the invention is to provide, in an automobile headlight, a reflector including a main reflecting portion for the main lamp, and auxiliary reflecting surfaces at either side thereof for the auxiliary lights. Each of these auxiliary reflecting surfaces is properly designed so that it will reflect light from the auxiliary lamp therein in a direction inclined to the longitudinal axis of the vehicle on which the light is mounted.

A further object is to provide, in an automobile including a steering mechanism and a headlight of the character above-noted, a switch operating mechanism which is associated with the steering mechanism whereby it is rendered effective to turn on an auxiliary light as an automatic incident to the making of a turn by the vehicle.

Various other more detailed objects and advantages of the invention such as arise in connection with carrying out the above-noted thoughts in a practical embodiment will in part become apparent and in part be hereinafter stated as the description of the invention proceeds.

The invention, therefore, comprises a novel headlight designed to be mounted on an automobile including a steering mechanism, and which headlight consists essentially of a main illuminating lamp and two auxiliary lamps arranged on opposite sides of the main lamp, together with a reflector including reflecting surfaces for each lamp, and an electrical circuit including switch devices which are operatively associated with the steering mechanism.

For a full and more complete understanding of the invention, reference is hereby made to the following description and accompanying drawings wherein:

Figure 1 is a top plan view of a headlight and steering mechanism with which this headlight is associated in accordance with the precepts of this invention. This view is somewhat diagrammatic.

Figure 2 is a wiring diagram for the headlight and the operating switches;

Figure 3 is an enlarged detailed section taken through the headlight per se, on a horizontal plane, and Figure 4 is a top plan view somewhat similar to Figure 1, but with a portion of the headlight broken away and shown in section to illustrate the condition when a turn is being made.

Referring now to the drawings wherein like reference characters denote corresponding parts, and first more particularly to Figure 3, a novel headlight such as provided by this invention is identified in its entirety by the reference character H. While a single headlight is illustrated in the drawing and herein described, it is to be clearly understood that the preferred arrangement will be for the automobile to be equipped with two of these headlights and they may be mounted on any part of the car as suits the wishes of the designer.

The headlight H comprises a casing 10 of cup-shaped formation, providing a bottom 11 which includes a depressed part 12 formed with a central opening. A cable 13 passes through this opening and a packing ring 14 seals the connection between the cable 13 and the opening in the depressed part 12. At this point it might be well to note that the cable 13 includes three wires 15, 16 and 17, the purpose of which will be later described.

The outer free edge of the casing 10 is turned over to provide an inwardly extending flange 18, and the cylindrical wall of the casing is formed with an annular groove 19. A reflector 20 has an outwardly extending flange 21 which overlies the flange 18. A gasket illustrated at 22 is positioned over the reflector flange 21 and a lens 23 is positioned with its peripheral edge portion engaging the gasket 22. A retaining ring 24 has a lip 25 which is snapped into the annular groove 19, and is also formed with an overhanging flange 26 which fits over the edge portion of the lens 23. It is evident that this retaining ring 24 serves to hold the reflector 20 and lens 23 in assembled position with respect to the casing 10.

The main body part of the reflector 20, preferably has a parabolic reflecting surface which is formed with a central socket 27, which receives a main illuminating lamp 28. The wire 16 goes to this lamp 28. At one side of the socket 27, the main parabolic reflecting surface of the reflector 20 is interrupted by an auxiliary reflecting surface 29 which includes a central socket 30 that carries an auxiliary lamp 31. The wire 17 extends to this auxiliary lamp 31.

Likewise, the reflecting surface of the reflector 20 on the opposite side of the socket 27 is interrupted by the formation of an auxiliary reflecting surface 32, which includes a socket 33 which carries another auxiliary lamp 34. The wire 15 is connected to the latter.

Referring now more particularly to Figure 1, the steering mechanism of a conventional automobile is identified in its entirety by the reference character S. The mechanism S comprises a steering wheel 35, which is operatively connected by column 36 with a worm gear shown by dotted lines 37. The latter meshes with a gear sector 38 which drivably carries a crank arm 39. A pivotal connection shown at 40 operatively connects this crank arm 39 to the linkage which goes to the front wheels. The latter is not a part of the invention and is not herein illustrated or described. It is important to note that the arm 40 carries a projection 41 for a purpose to be later described in detail.

The worm 37, gear 38 and associated instrumentalities may be enclosed in a housing 42. Mounted on the latter are a pair of brackets 43 and 44. A switch shown at 45 is carried by the bracket 43 and is included in the circuit of the wire 17. This switch includes a contact element 46 which is engaged by a slide 47 mounted on a guide rod 48. A coil spring 49 encircles the latter and engages the slide 47 at one end, and a corresponding slide, or spring follower 50, at the other. This spring follower 50 is forced against the projection 41 by the spring 49. It is evident that as the crank arm 39 is moved in a counter-clockwise direction (speaking with reference to the showing of Figure 1), the projection 41 will move the spring follower 50 to the left, and when appreciable tension is built up on the spring 49, the latter will urge the slide 47 to the left to actuate the contact 46 and complete the circuit of the wire 17.

Likewise, a switch 51 is included in the circuit of the wire 15. This switch 51 includes a contact 52, which corresponds to the contact 46 and which is actuated by a slide 53 mounted on the guide rod 48. A second coil spring 54 which corresponds to the spring 49 is disposed about the rod 48, and engages the slide 53 at one end, and a spring follower 55 at the other.

Wiring diagram

Figure 2 illustrates diagrammatically the wiring diagram of the lamps 28, 31 and 34, and the switches 45 and 51. It is noted that the lamp 34 is grounded at one side as indicated at 56, while the wire 15 comes in from the other side. Likewise, the lamp 31 is grounded at one side as shown at 57, and the wire 17 comes into the other side. The main illuminating lamp 28 is also grounded as indicated at 58, while the wire 16 is connected to the live side of the lamp 28.

A source of power is represented by the batteries 59, the latter being grounded as shown at 60. From the battery a main line 61 extends to the lamp assembly, and this line 61 includes a main headlight switch 62. The switch 45 is represented diagrammatically and is depicted as being included in the line 17. The lines 15, 16 and 17 all join in with the main current supply line represented at 63.

Operation

With the steering mechanism in a straight position, that is, one in which the vehicle is being driven forwardly in a substantially straight line and with the main switch 62 turned on, only the main illuminating lamp 28 is effective. This lamp casts a beam of light straight down the road.

When the driver of the car makes a turn, he avails of the steering mechanism for that purpose. Let us assume that the turn is to be to the left. The steering mechanism S will cause the crank arm 39 to move in a counter-clockwise direction, thus, the switch 45 is affected to complete the circuit through the wire 17. This turns on the lamp 31 and the latter, due to its mounting in the auxiliary reflector 29, casts a beam to the left-hand side of the road.

The conditions which actually exist when a right-hand turn is being made is brought out in Figure 4, which shows the beam of light from the auxiliary lamp 34 going off to the right-hand side in a direction inclined to the longitudinal axis of the headlight H.

While a preferred specific embodiment of the invention is hereinbefore set forth, it is to be clearly understood that the invention is not to be limited to the exact constructions illustrated and described, because various modifications of these details may be provided in putting the invention into practice within the purview of the appended claims.

What is claimed is:

1. A switch mechanism for an automobile headlight control comprising a support, an elongated guide rod carried by the support, a pair of switches rigidly carried by the support adjacent the ends of the guide rod, a pair of slides on the guide rod engageable with the switches respectively to operate them, a pair of springs on the guide rod engaging the slides respectively and spaced apart at their inner ends, and operating means engaging the inner ends of the springs and movable selectively to compress the springs thereby selectively to operate the switches.

2. A switch mechanism for an automobile headlight control comprising a support, an elongated guide rod carried by the support, a pair of switches rigidly carried by the support adjacent the ends of the guide rod, a pair of slides on the guide rod engageable with the switches respectively to operate them, a pair of springs on the guide rod engaging the slides respectively and spaced apart at their inner ends, a pair of spring followers on the guide rod engaging the inner ends of the springs respectively, and operating means between the followers movable longitudinally of the guide rod.

3. A switch mechanism for an automobile headlight control comprising a support, an elongated guide rod carried by the support, a pair of switches rigidly carried by the support adjacent the ends of the guide rod, a pair of slides on the guide rod engageable with the switches respectively to operate them, a pair of springs on the guide rod engaging the slides respectively and spaced apart at their inner ends, a pair of spring followers on the guide rod engaging the inner ends of the springs respectively, a crank arm pivoted on the support and normally lying at a right angle to the guide rod, and a projection on the crank lying between the followers.

LEE S. TREESE.

REFERENCES CITED

The following references are of record in the file of this patent:

UNITED STATES PATENTS

| Number | Name | Date |
| --- | --- | --- |
| 1,164,738 | Meeker | Dec. 21, 1915 |
| 1,214,309 | Jillson et al. | Jan. 30, 1917 |
| 1,271,265 | Batchell | July 2, 1918 |
| 1,779,799 | Blum | Oct. 28, 1930 |
| 1,795,614 | Morgan | Mar. 10, 1931 |
| 1,941,274 | Schacht | Dec. 26, 1933 |
| 2,313,506 | Berg | Mar. 9, 1943 |

FOREIGN PATENTS

| Number | Country | Date |
| --- | --- | --- |
| 809,909 | France | 1936 |